(12) United States Patent
Klein

(10) Patent No.: US 10,471,403 B2
(45) Date of Patent: Nov. 12, 2019

(54) INSECT TRAPPING AND BARRIER COMPOUND

(71) Applicant: Arnold Gregory Klein, Sandia Park, NM (US)

(72) Inventor: Arnold Gregory Klein, Sandia Park, NM (US)

(*) Notice: Subject to any disclaimer, the term of this patent is extended or adjusted under 35 U.S.C. 154(b) by 462 days.

(21) Appl. No.: 14/544,661

(22) Filed: Feb. 2, 2015

(65) Prior Publication Data

US 2016/0219860 A1  Aug. 4, 2016

(51) Int. Cl.
*A01M 1/14* (2006.01)
*B01F 15/02* (2006.01)

(52) U.S. Cl.
CPC .......... *B01F 15/0216* (2013.01); *A01M 1/14* (2013.01)

(58) Field of Classification Search
CPC .............................. A01M 1/14; A01M 1/2005
See application file for complete search history.

(56) References Cited

U.S. PATENT DOCUMENTS

| | | | | |
|---|---|---|---|---|
| 4,578,302 A * | 3/1986 | Schmidt, Jr. | ............ | B32B 27/04 156/295 |
| 2004/0216367 A1* | 11/2004 | Klein | ...................... | A01M 1/02 43/114 |
| 2011/0289824 A1* | 12/2011 | Wu | ......................... | A01N 33/24 43/132.1 |
| 2013/0036664 A1* | 2/2013 | Nicholas | ................ | A01G 13/10 47/32 |
| 2013/0101654 A1* | 4/2013 | Mathis | .................... | A01N 59/00 424/405 |

* cited by examiner

*Primary Examiner* — Jessica B Wong

(57) ABSTRACT

An improved insect trapping and barrier adhesive compound having a significantly enhanced mechanical insecticide and insect repelling action. The improved insect trapping and barrier compound is supplied in bulk to be used outdoors for the spot control of insect pests. Alternatively it may be supplied already applied to a disposable media for indoor or very localized outdoor insect control applications.

8 Claims, No Drawings

INSECT TRAPPING AND BARRIER COMPOUND

Applicant claims the benefit of provisional application No. 61/965,732 filed on Feb. 7, 2014.

FIELD OF THE INVENTION

The present invention relates to a compound to be used as an insect barrier or trapping adhesive for the spot control and extermination of insect pests.

BACKGROUND OF THE INVENTION

At the present time, there are a multitude of commercial products available for controlling and/or exterminating insects in the home and garden. The majority of these products use chemically based insecticide agents that act as toxins and or nerve agents against insects. These toxin based insect controls are very effective for the control of insect pests, but they typically have serious, and undesirable environmental side effects. These insecticides are often toxic to non-targeted organisms including children, pets, birds, bees and other non-target animals. These adverse environmental side effects are typically referred to as "overkill".

In recent years many consumers have become increasingly environmentally conscious and aware of the undesirable side effects of using chemical toxin based insect controls. As a result of this awareness, a growing demand has emerged for insect control products that do not have these "overkill" side effects. One type of widely used "mechanical", non-toxic means for insect trapping and repelling are tacky compounds that are spot applied for use as barrier and or trapping substance for insects. These tacky substances are either directly applied to surfaces or come applied to some sort of disposable media, such as flypaper, barrier tape or glue-boards.

Some widely used products for crawling insect control are non-toxic, tacky compounds and or non-drying adhesives known by the trade name Tangle-foot®, Tackem™ or Stickem™. These products are typically used outdoors as an insect barrier or trapping media for protecting plants, trees, picnic tables, etc. from crawling insect pests. These insect barrier and trapping products are said to work "mechanically" as they present a tacky substance that insects will avoid crossing over or which they become trapped in. They do not act as chemically toxic agents and are therefore considered generally environmentally safe to use. There are many other commercially produced "tacky" compounds or non-drying adhesive formulations products that are sold to be used as barriers and or trapping media for the control of crawling insects. These tacky compound barrier products do not typically act as insecticides except in the cases where the crawling insects are trapped because they cannot pull away from them. The products that trap and eventually kill insects indoors are typically applied to a disposable media as is done with flypaper and glue boards.

The tacky compounds and non-drying adhesives are locally effective, but that effectiveness is often limited because they do not typically kill insects and they are repeatedly challenged by insects that can eventually find a route past or over them. These tacky compounds are therefore usually applied in a very thick or heavy coating to prevent insect passage. Also, and in order to reduce this barrier challenging behavior, some non-drying insect control compounds use an incorporated repellent means. The use of repellent agents has limited effectiveness due to the volatilization and vapor dissipation that occurs with these compounds typically within a week or two after application. The insect barrier and trapping compounds are generally applied without any significant overkill effects as found with chemical insect controls, but since they have no direct insecticide effects, and often degrade or melt during very warm weather, they have to be regularly monitored and frequently reapplied.

In general, the difficulty in cleaning up these tacky compounds makes it impractical to use them for spot insect control except for outdoor applications. Typically for indoor applications these tacky compounds are supplied from the manufacturer pre-applied to some disposable media such as paper or plastic. The insect traps for indoor applications i.e. flypaper, glue boards and tacky tapes are generally made using non-drying adhesive formulations whose surface can be protected before they are used with low adhesion paper.

Another mechanical or non-chemical means of insect control is the surface application or dusting of a material known as diatomaceous earth. Diatomaceous earth is a non-toxic, inert material, made up of the microscopic skeletons of minute, one-celled plants called diatoms. These diatoms existed in vast numbers in the earth's seas approximately 300 million years ago. Diatomaceous earth is now mined from quarries and further processed through milling to be converted into a fine "talc" like powder. The milling process cracks apart the diatom skeletons, exposing very sharp, microscopic silica needle type structures. The diatomaceous earth (skeletons) are small and sharp enough to scratch through an insect's exoskeleton which is composed of a hard porous cover protected from the air by an oily or waxy seal. Once an insect exoskeleton is scratched through, the insect is subject to dehydration and eventual death. A related insecticide action of the diatomaceous earth is that if dusted directly on the insect pests it can get in between their exoskeleton joints where as the insect moves, the action of the joint movement causes their exoskeleton to get abraded. Diatomaceous earth is not hazardous to people, animals, birds or other non-insect organisms, except if the dust is inhaled during the application process. In fact, food grade diatomaceous earth is sold as a dietary supplement and is widely added to protect grain stores from insect infestation.

The usual insect controlling application of diatomaceous earth is by dusting the "talc" like material over an area where insect control is desired. This application is normally effective for a very limited time as the diatomaceous earth powder is washed away by rain or irrigation or simply gets sifted down below larger soil surface debris (mulch, aggregate, sand, loose soil particles, etc.). Additionally, since the diatomaceous earth is in the form of a very fine powder and not held in place, the effectiveness of the silica needles to scratch an insect exoskeleton is substantially reduced. The limited effectiveness of the insecticide action of diatomaceous earth can be improved if it is located directly next to an insect, trapping adhesive using a tape or other fixative mounting as is disclosed in my published patent application US 2004/0216367 A1. If the diatomaceous earth is close enough to the non-drying adhesive, the insects will scratch their exoskeleton against it by rubbing against it while making strenuous efforts to get free of the trapping adhesive.

The specific problem that the instant invention seeks to solve is that neither of the commonly used non-toxic insect control compounds (diatomaceous earth and non-drying adhesives) are particularly effective at killing or controlling insect pests. They are non-toxic to people, pets, birds and animals and unfortunately, most pest insects. The non-drying adhesives (tacky compounds) do not typically kill larger insects and ants are usually strong enough to pull away. The diatomaceous earth does not stay in place for very long and even when insects come into contact with it, they typically do not any strenuous efforts to rub it off Since the diatomaceous earth only works as an effective abrasive when combined with a rubbing force, it has a very limited insecticide effect. There is then, a real need for a "non-toxic" insect control compound that is much more effective at killing or deterring insects.

DETAILED DESCRIPTION OF THE INVENTION

The instant invention combines an insect trapping, adhesive compound with diatomaceous earth to create an improved insect trapping and barrier compound that is much more effective at deterring and killing insects than the current trapping/barrier compounds or the diatomaceous earth alone. The "Improved Insect Barrier and Trapping Compound" acts as an insect trapping or barrier substance just as any of the other insect trapping or barrier compounds, but because the improved compound contains diatomaceous earth, it will also exterminate insects that get it stuck onto their exoskeleton exterior. The extermination action of the diatomaceous earth is not immediate, but once the insects get into this improved insect paste compound they will typically make an immediate and forcefully active effort to try and rub it off. This active and forceful attempt to rub off the sticky paste increases the resultant abrasive action of the embedded diatomaceous earth. This rubbing causes damaging (mortal) scratches in the insect's exoskeleton exterior and skeletal joints. The Applicant has observed, particularly with ants, that when the insect attempts to rub off the diatomaceous earth they typically spread it onto their head parts and other areas of their exterior including their exoskeleton joints. By direct observation it appears that when the insects attempt to rub off the adhesive, they have a vague sensation that they are abrading their exoskeleton. As a result of sensing this potentially fatal abrasion there is a marked reduction in their challenge attempts to get past the adhesive barrier. This allows the Improved Insect Barrier and Trapping Compound to have an insect repelling effect that does not diminish due to evaporation or volatilization of the repelling agent.

Another advantage of this diatomaceous earth fortified paste is that the diatomaceous earth, being held in suspension by the water resistant insect trapping compound is not washed or sifted away as typically happens rather quickly with the typical diatomaceous earth dusting application. Additionally, the suspended diatomaceous earth acts to thicken and stabilize many of the insect trapping compounds, making them more viscous, environmentally stable and more resistant to warm weather melting. This environmental stability effect is particularly pronounced with some of the less viscous insect trapping formulations. This is an important and somewhat unexpected performance advantage that greatly reduces the need for frequent re-application, and which prevents the compound from migrating or melting away from the initial application location.

The diatomaceous earth fortified insect trapping and barrier compound has some very significant advantages over the currently available insect trapping and barrier formulations. The mechanical insecticide action of the improved compound results in a reduction of insect pests that remain alive to challenge the barrier. The insects that become trapped in the adhesive whether used outdoors or indoors die more quickly than when they are just trapped. This insecticide action is due to them "drying out" due to the exoskeleton abrasion. In the case where the improved insect trapping and barrier compound is applied to a disposable media, i.e. flypaper, window fly-traps, etc. it will kill the adhered insects quicker. This may be a significant advantage to some consumers who find it objectionable to see trapped insects struggling and eventually dying over a period of several hours or even days. Larger insects that get into the improved compound, but that do not get trapped will die at a later time away from the point of application.

The improved compound significantly increases the insecticide action of the diatomaceous earth and extends the effectiveness of this mechanical insecticide, while enhancing the environmental stability of the typical trapping, adhesive compound.

The diatomaceous earth is a very inexpensive material that is relatively simple to mix with most insect trapping compounds and/or nondrying adhesives. The process of mixing the diatomaceous earth and non-drying adhesive is a little more involved where the non-drying adhesive is a hot melt type. In this instance, the hot melt adhesive pieces or "pillows" would have to be heated enough that they are a semi-viscous fluid. Of course it is a relatively straightforward process to fill containers adapted for consumer end use i.e. squeeze tubes, cartridges or metal cans with the improved insect trapping and barrier compound. The filling of these consumer end use containers with the improved insect trapping and barrier compound would be a more or less automated process depending on sales volumes. The application of non-drying, insect trapping or barrier adhesives to disposable media, i.e. flypaper or ribbons, and traps is well known in the art. The improved insect barrier and trapping compound of the instant invention would be applied in a more or less equivalent fashion.

The Applicant has not observed that there is no fixed mixing ratio for this improved compound to be effective, but has discovered through experimentation that an approximate ⅓ ratio of diatomaceous earth to ⅔ ratio of trapping adhesive gives the consistent result of the enhanced insecticide and environmental stability of this compound.

I have now described my invention in considerable detail, however others skilled in the art can devise and develop alternate and equivalent constructions. Hence, I desire my protection to be limited not by the compound described, but only by the proper scope of the appended claims.

I claim:

1. A system for trapping insects comprising: an adhesive mixed with diatomaceous earth.

2. The system of claim 1 wherein said system is a non-toxic and a mechanical insecticide.

3. A system of claim 1 wherein said diatomaceous earth thickens and stabilizes said adhesive.

4. The system of claim 1 wherein the system comprises a ratio of approximately one part diatomaceous earth to two parts insect trapping adhesive.

5. The system of claim 1 wherein the adhesive comprises non-drying adhesive.

6. The system of claim 5 wherein the non-drying adhesive comprises a hot melt adhesive.

7. The system of claim 1 wherein the system further comprises a container.

8. A system for trapping insects comprising a mixture of diatomaceous earth and an insect trapping adhesive, wherein the mixture comprises a sticky paste comprising one part diatomaceous earth and two parts adhesive.

* * * * *